US008953045B2

(12) United States Patent
Priesterjahn et al.

(10) Patent No.: US 8,953,045 B2
(45) **Date of Patent: *Feb. 10, 2015**

(54) AUTOMATED TELLER MACHINE COMPRISING AT LEAST ONE CAMERA TO DETECT MANIPULATION ATTEMPTS

(75) Inventors: Steffen Priesterjahn, Paderborn (DE); Dinh-Khoi Le, Paderborn (DE); Michael Nolte, Brakel (DE); Alexander Drichel, Bielefeld (DE)

(73) Assignee: Wincor Nixdorf International GmbH (DE)

( * ) Notice: Subject to any disclaimer, the term of this patent is extended or adjusted under 35 U.S.C. 154(b) by 449 days.

This patent is subject to a terminal disclaimer.

(21) Appl. No.: 13/264,125

(22) PCT Filed: Apr. 16, 2010

(86) PCT No.: PCT/EP2010/055010

§ 371 (c)(1), (2), (4) Date: Oct. 12, 2011

(87) PCT Pub. No.: WO2010/121953

PCT Pub. Date: Oct. 28, 2010

(65) Prior Publication Data

US 2012/0038773 A1 Feb. 16, 2012

(30) Foreign Application Priority Data

Apr. 22, 2009 (DE) ........................ 10 2009 018 319

(51) Int. Cl.
*H04N 7/18* (2006.01)
*G06Q 40/00* (2012.01)
*G07F 19/00* (2006.01)

(52) U.S. Cl.
CPC ............ *G07F 19/2055* (2013.01); *G07F 19/20* (2013.01); *G07F 19/207* (2013.01)
USPC .......................................... 348/150; 235/379

(58) Field of Classification Search
USPC .......................................... 348/150; 235/379
See application file for complete search history.

(56) References Cited

U.S. PATENT DOCUMENTS

2008/0219508 A1* 9/2008 Ganguli et al. ............... 382/104
2009/0201372 A1* 8/2009 O'Doherty et al. ........... 348/150

FOREIGN PATENT DOCUMENTS

DE 20102477 U1 5/2001
EP 1965361 A2 9/2008

(Continued)

OTHER PUBLICATIONS

International Preliminary Report on Patentability (Chapter I of the Patent Cooperation Treaty) in German (with English translation) for PCT/EP2010/055010, issued Oct. 25, 2011.

(Continued)

*Primary Examiner* — Dave Czekaj
*Assistant Examiner* — Tsion B Owens
(74) *Attorney, Agent, or Firm* — Harness, Dickey & Pierce, P.L.C.

(57) ABSTRACT

The invention proposes an automated teller machine having different control elements, such as a card entry slot (4), for example, wherein at least one camera (CAMK) is integrated in a control element, the card entry slot (4), for example, and captures images of a plurality of sub-regions attributed to said control element (4), such as an interior region, outer region and overhead region. Lighting (L) that illuminates one or some of the partial regions, the interior region or the slit region of the card entry slot (4), for example, can also be arranged, thereby also improving the image. In addition, the construction can be furnished with a light-conducting material (K) over which light produced by the lighting (L) can be guided and distributed.

16 Claims, 4 Drawing Sheets

(56) References Cited

FOREIGN PATENT DOCUMENTS

| | | | | | | |
|---|---|---|---|---|---|---|
| EP | 1965361 | A2 | * | 9/2008 | .............. | G07F 19/00 |
| GB | 2351585 | A | * | 1/2001 | .............. | G07F 19/00 |
| WO | WO-2007093977 | A1 | | 8/2007 | | |

OTHER PUBLICATIONS

International Search Report (in German with English Translation) for PCT/EP2010/055010, mailed Aug. 26, 2010; ISA/EP.

* cited by examiner

AUTOMATED TELLER MACHINE COMPRISING AT LEAST ONE CAMERA TO DETECT MANIPULATION ATTEMPTS

CROSS-REFERENCE TO RELATED APPLICATIONS

This application is a National Stage of International Application No. PCT/EP2010/055010, filed Apr. 16, 2010, and published in German as WO 2010/121953 A1 on Oct. 28, 2010. This application claims the benefit and priority of German application 10 2009 018 319.1, filed Apr. 22, 2009. The entire disclosures of the above applications are incorporated herein by reference.

BACKGROUND

This section provides background information related to the present disclosure which is not necessarily prior art.

TECHNICAL FIELD

The invention relates to an automated teller machine comprising at least one camera. The invention relates specifically to an automated teller machine that is configured as a cash dispenser.

DISCUSSION

In the area of self-service automats, in particular cash dispensers, criminal activities in the form of manipulation are frequently undertaken with the goal of spying out sensitive data, in particular PINs (personal identity numbers) and/or card numbers of users of the automated teller machine. Manipulation attempts are known specifically in which so-called skimming devices, such as keypad overlays and similar, are installed illegally in the operating area or on the control panel. Such keypad overlays often have their own power supply, as well as a processor, a memory and an operating program so that an unsuspecting user is spied on when entering his PIN or inserting his bank card. The data mined in this way are then sent over a transmitter integrated into the keypad overlay to a remote receiver or stored in a memory in the overlay. Many of the skimming devices encountered today can be distinguished only with great difficulty by the human eye from original control elements (keypad, card reader, etc.).

In order to frustrate such manipulation attempts, surveillance systems are often used that have one or more cameras installed close to the site of the automated teller machine and capture images of the entire control panel and often the area occupied by the user as well. One such solution is described in DE 201 02 477 U1. Images of both the control panel and the user area immediately in front of said panel can be captured using camera surveillance. One additional sensor is provided in order to distinguish whether a person is in the user area.

SUMMERY OF THE INVENTION

An object of the present invention is to propose a solution for camera surveillance that permits reliable detection of manipulation attempts without using a supplementary sensor system.

Accordingly, an automated teller machine is proposed in which, to detect manipulation attempts, at least one camera is integrated in one of the elements provided in the control panel and captures images of several sub-regions assigned to this element. For example, a card entry slot of which the camera captures images of one part of the inner region, of the outer region and of a transition region located between the two other regions. In this way, different manipulation attempts can be detected with just one camera and differentiated images captured or evaluated. The card entry slot can preferably be lighted, which is also of benefit to the camera.

Thus, using one camera installed directly in one element, such as the card entry slot for example, images of different sub-regions on the element itself and in its surroundings can be captured as required, allowing the image data acquired to be evaluated separately by sub-region. Said sub-regions are, for example, an inner region and an outer region of the element and a transition region therebetween. Capturing images by sub-region has the advantage in turn that manipulations can be detected very precisely and reliably. When applied to a card entry slot, this means that a precise distinction can be made whether the card entry slot was covered completely with an illegal overlay or whether a foreign body was introduced into the entry slit. If the card entry slot is lighted, this can be used in addition for the camera images. The lighting that lights one or several sub-regions of the card entry slot can be designed for optimal illumination of the areas imaged by the camera.

The card entry slot, in particular its slit area, is preferably furnished with a light-conducting material through which light produced by the lighting is conducted. The material can be colored in order to achieve a specific lighting color that is especially suitable for the image.

The at least one camera is connected to a data processing unit that processes the image data generated, for example by segmenting and processing said data according to the sub-regions. For this purpose, the data processing unit can have a first stage receiving the image data for image processing, specifically for shadow removal, edge detection, vectorizing and/or segmenting. In addition a downstream second stage for feature extraction can be provided, specifically using blob analysis, edge position and/or color distribution. One more downstream third stage for classification can be additionally provided. The data processing unit preferably also contains interfaces for video surveillance systems (20) and/or security systems. The data processing unit can be integrated into the automated teller machine.

Accordingly it is also of advantage if the automated teller machine has at least one additional camera that is mounted to or in the automated teller machine in close proximity to the control panel and captures images of at least one of the elements. The elements provided in the control panel and imaged by the cameras can be, for example, a cash dispensing drawer, a keypad, an installation panel, a card entry slot and/or a monitor.

An arrangement can also be made to provide an additional camera on the automated teller machine for an area where a user, more specifically his head, is located while using the automated teller machine. In this way a portrait of the user can be taken when needed.

Preferably provision is made for the data processing unit by processing the image data, when it detects a manipulation attempt and/or detects manipulation at one of the several cameras, to trigger an alarm, disable the automated teller machine and/or activate the supplementary camera. Provision can also be made for the cameras and/or the data processing unit to be deactivated during operation and/or maintenance of the automated teller machine.

In combination with the use of several cameras, provision is preferably made for the data processing unit to combine and evaluate the image data generated by the several cameras in order to detect manipulations at one or more of the cameras. By combining and evaluating the image data manipulations in the coverage area of one or more of the cameras can be detected. In particular the data processing unit can combine and evaluate the image data in order to detect discrepancies that relate to the image content, image structure and/or image quality, in particular image lighting level and/or brightness.

Individual cameras at least can be mounted in a housing section of the automated teller machine surrounding the control panel, in particular be installed in that housing section of the automated teller machine that bounds the control panel to the side or to the top. A single one of the cameras can capture images of at least two of the elements provided in the control panel, in particular two control elements, such as a cash dispensing drawer and a keypad for example. Another camera in turn can be integrated into one of the elements provided in the control panel, specifically integrated into a card entry slot.

BRIEF DESCRIPTION OF THE DRAWINGS

The invention and the advantages resulting therefrom are described hereinafter using embodiments and with reference to the accompanying schematic drawings. The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
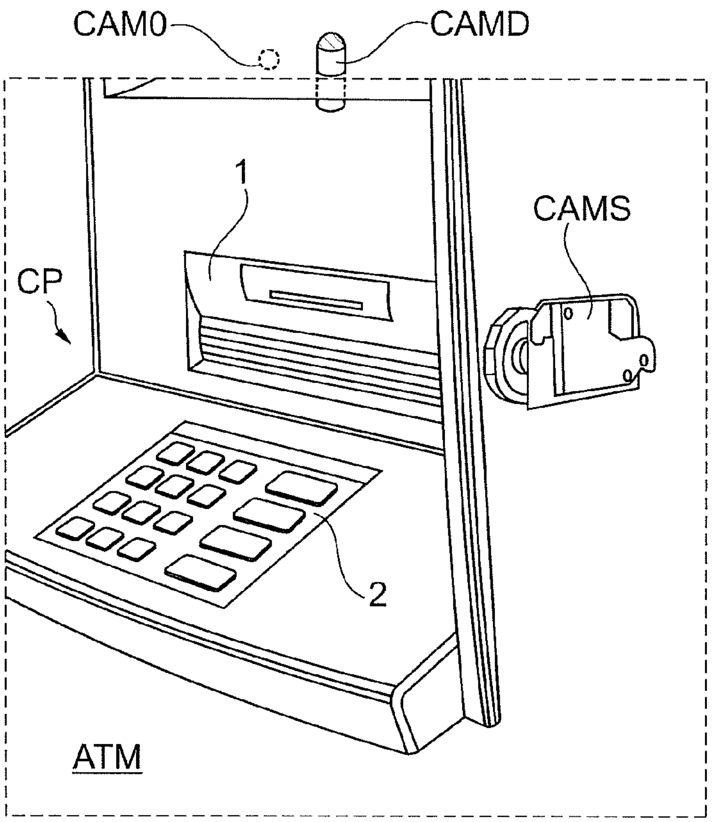
FIG. 1 shows a perspective view of the control panel of an automated teller machine with several cameras.

FIG. 1 shows in a perspective view the basic structure of a self-service terminal in the form of an automated teller machine. The automated teller machine ATM control panel includes in particular a cash dispensing drawer 1, also called a shutter, and a keypad 2, i.e. control elements which can be favorite targets for manipulation attempts in the form of overlays, for example, for the purpose of skimming. The automated teller machine ATM is equipped with several cameras for detecting these and similar manipulation attempts, wherein at least one camera (see CAMK in FIGS. 3 and 4*a*) is integrated directly into one of the control elements, in this instance into the card entry slot (see 4 in FIGS. 3 and 4*a*) of the automated teller machine.

FIG. 1 first shows the other cameras that are mounted at different locations, preferably in the vicinity of the control panel. Said cameras are a side camera CAMS, a top view camera CAMD and an supplementary portrait camera CAMO.

Cameras CAMS and CAMD are located within a boundary, frame or similar and are mounted there. Each of these cameras CAMS or CAMD captures images from the outside in each case of at least one of the elements arranged in the control panel of the automated teller machine, for example the cash dispensing drawer 1 (shutter) and/or the keypad 2. The lateral camera CAMS preferably captures images of just these two elements 1 and 2; the top view camera CAMD captures images of still more elements in addition (see also FIG. 3). In contrast, camera CAMK integrated into the card entry slot 4 captures images of the interior region of this element. This camera CAMK and its function will be described later in detail using FIGS. 3 and 4*a/b* and FIG. 5.

Besides the cameras positioned immediately at or in the control panel, the supplementary camera CAMO is located in the upper housing section of the automated teller machine ATM and is directed at the area in which the user stands when operating the automated teller machine. In particular this camera CAMO captures images of the head or face of the user and is therefore described here also as a portrait camera.

Figure 2:
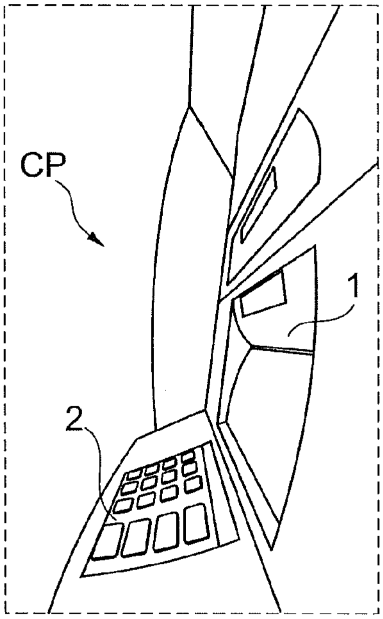
FIG. 2 reproduces the coverage field of the camera from FIG. 1 that captures images of the control panel from the side.

FIG. 2 shows the coverage area of camera CAMS that is located in a lateral part of the housing that frames or surrounds the control panel of the automated teller machine ATM. The cash dispensing drawer 1 and the keypad 2 specifically are in the angle of vision of this side camera CAMS. This camera CAMS specifically is equipped with a wide-angle lens in order to capture images of at least these two elements or sub-regions of the control panel. The automated teller machine ATM is constructed such that elements 1 and 2 already mentioned preferably have the most homogenous surfaces possible with edges delimiting said surfaces. This simplifies object recognition. By mounting camera CAMS in this particularly suitable position, the sub-regions or elements 1 and 2 named can be measured optically with a high degree of reliability. Provision can be made for the camera to be focused sharply on specific areas.

Figure 3:
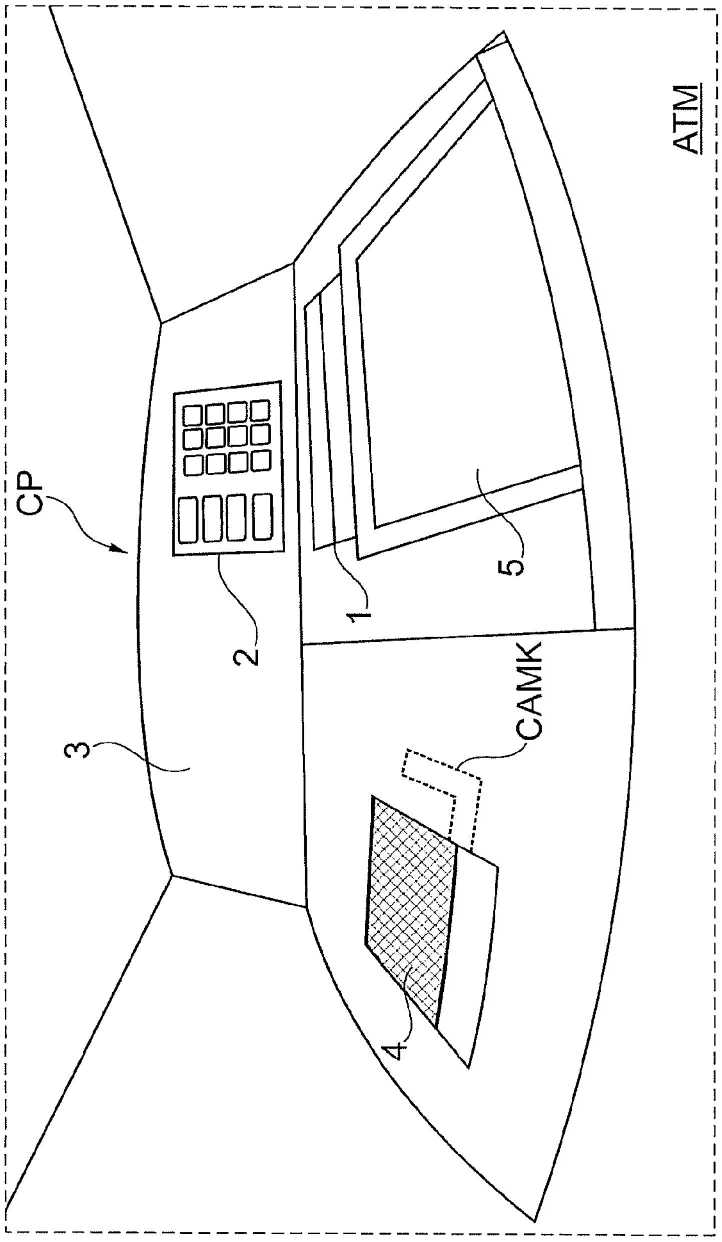
FIG. 3 reproduces the coverage field of the camera from FIG. 1 that captures images of the control panel from above.

A different perspective, that of the top view camera CAMD, is clarified using FIG. 3. The Figure illustrates the field of coverage of this camera CAMD that is installed in the upper area of the automated teller machine ATM (see also FIG. 1) and captures images of the control panel from above. Still further elements can be included in the field of coverage of the camera beside the cash dispensing drawer 1 and the keypad 2, including an installation panel in the vicinity of the keypad, a card insert slot 4, i.e. the feed for the card reader, and a monitor or display 5. These additional elements mentioned 3, 4, 5 represent potential targets for manipulation attempts.

Figure 4A:
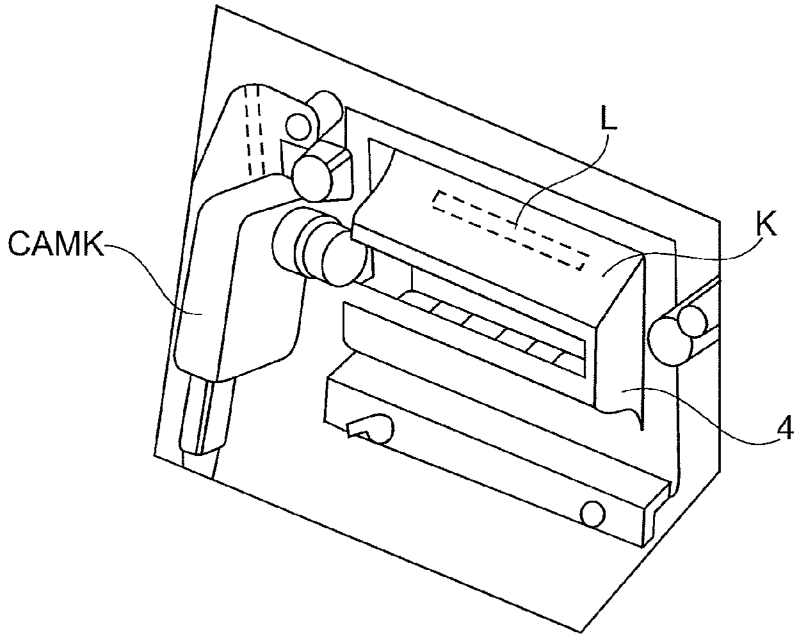
FIG. 4*a* shows the installation location of the camera that is integrated into the card entry slot.

As FIG. 4*a* illustrates using the example of an installation location, camera CAMK is integrated directly into the card entry slot 4. In order to achieve good image illumination for this camera CAMK, the lighting L for the card slit which is being employed anyway can be used. Camera CAMK is mounted to the side of the card slit, or entry slot, which is made from a special light-conducting material K. The lighting L is implemented by one or more light sources, such as light-emitting diodes for example, where the light generated is taken through the light-conducting material K to the actual card entry slot to illuminate said slot. The light can be taken as it comes from above and below so that the card slit is illuminated as evenly as possible. The light generated can be optimally adjusted in its intensity to meet requirements. The light can also be tinted by using colored LEDs or color filters so that it can be adjusted to the requirements of camera CAMK.

In order to detect manipulation by outside intervention, changes and the like, images are captured of predefined sub-regions and optically measured. In this way, deviations from reference values (normal status regarding image structure, image content, weighting of pixel areas, etc.) can be detected quickly and reliably. Different image processing methods (algorithms), or image processing steps (routines) are carried out within a data processing unit described more precisely later (see FIG. 5). The image data processing can be conducted by sub-region.

Figure 4B:
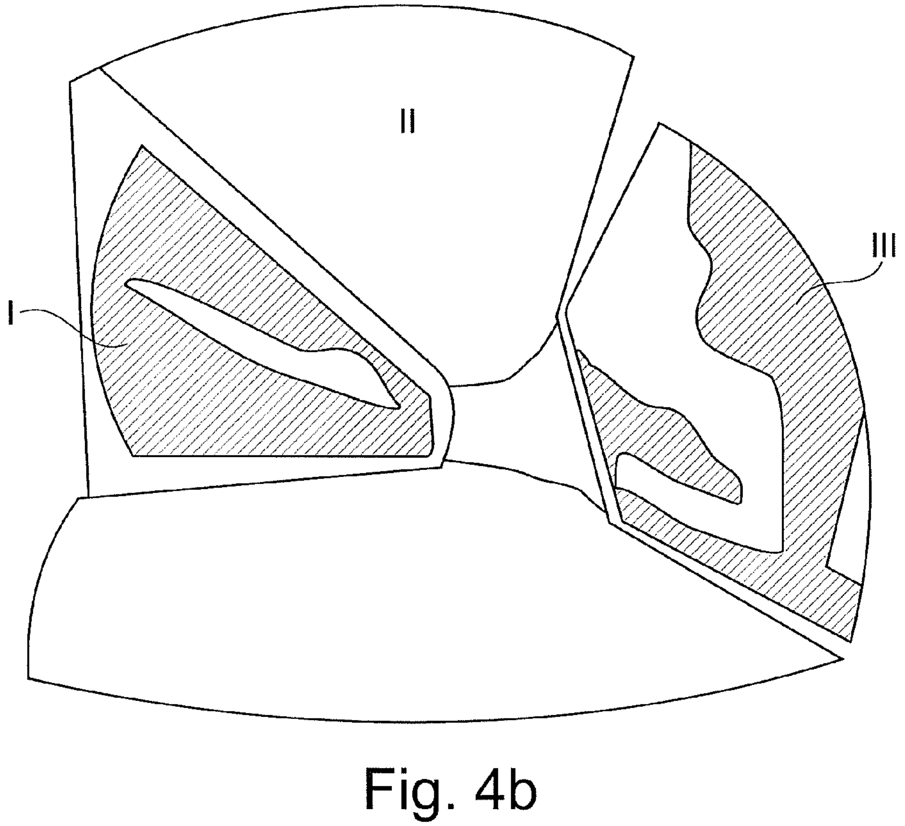
FIG. 4*b* reproduces the coverage field of this camera from FIG. 4*a*.

FIG. 4*b* illustrates the coverage area of camera CMK segmented into different sub-regions and shows clearly that said field of coverage is essentially subdivided into three sub-regions I, II and III.

The first sub-region I principally captures images of the interior region of the card entry slot, that is the actual card slit, sub-region III covers the outer region of the card entry slot, sub-region II covers the transition region lying between the other two. In conjunction with FIG. 4*a*, the following advantages of the design and installation method described here become clear:

Different types of skimming modules, overlays or manipulations can be detected very precisely through the internal camera position in which camera CAMK is arranged to the side in the card entry slot 4 and captures images of sub-regions I to III. This method of installation makes it possible to segment images corresponding to sub-regions I to III and to measure said sub-regions individually. The difference in contrast between the sub-regions can be put to good use in segmenting the image.

The camera CAMK is oriented here in such a way that an image of a person (user or attacker) standing in front of the automated teller machine can be captured with sub-region III. These image data can be compared in particular with those from the portrait camera CAMO (see FIG. 1). Camera CAMK is preferably installed on the same side of the terminal as camera CAMS so that the image data from these two cameras can also be compared.

The lighting L (see FIG. 7*a*) is used especially for the inner region I but also for parts of the transition region II in order to achieve the best possible illumination for the images. Colored lighting in the green range is particularly advantageous because the image sensors, or CCD sensors, of the camera are particularly sensitive to shades of green and have the greatest power of resolution. The lighting L improves object detection, particularly in poor lighting conditions (location, night time, etc.). Additionally, the lighting overcomes any reflections on an overlay that is to be detected caused by exterior light (e.g. incoming sunlight). The lighting L which is to be provided anyway for the card entry slot represents a reliable light source for camera CAMK. The actual card slit has a different color from the card entry slot so that a greater difference in contrast is created, which improves image evaluation.

Different methods are employed in image data processing, in particular a combination of segmenting and edge detection. The data processing unit (see FIG. 5) consists essentially of the following three stages:

An image processing stage for preprocessing the images or data arriving (e.g. for shadow removal, edge detection, segmenting), A features extraction stage (using blob analysis, analysis of edge position, color distribution, etc.), A classification stage (to determine detection features for manipulations).

Data processing will be described in greater detail later using FIG. 5 and can be implemented on a PC.

Camera CAMK is configured here as a color camera with a minimum resolution of 400×300 pixels. With saturated lighting, a color value distribution-based method to detect overlays and the like can be used. Camera CAMK has a wide-angle lens so that good images of the outer region (sub-region III in FIG. 4*a*) can be captured.

In the example described here at least the cameras CAMS, CAMD and CAMK mounted in the vicinity of the control panel are connected to the data processing unit 10 (see FIG. 5) to provide a clear improvement in the detection of manipulations by a combination of image data. This data processing unit described later makes it possible to evaluate the image data generated by the camera optimally in order to detect a manipulation attempt such as an overlay on the keypad 2 or manipulation at one of the cameras immediately and positively and to trigger alarms and deactivation as required. The following are some of the manipulations that can be positively detected using the data processing unit to be described in greater detail later:

Installation of a keypad overlay,

Installation of a complete overlay at the lower installation panel,

Installation of an overlay at the cash dispensing drawer (shutter) and/or installation of objects to record security information, particularly PINs, such as mini-cameras, camera cell phones and similar spy cameras.

In order to detect the presence of overlays, an optical measurement of the imaged elements, such as the keypad 2, is performed inside the data processing unit 10 with the aid of the cameras CAMS and CAMD, in order to detect discrepancies clearly in the event of manipulation. Tests on the part of the applicant have shown that reference discrepancies in the millimeter range can be detected clearly. To detect foreign objects (spy camera), a combination of edge detection and segmenting can be used in order to detect clearly the contours of foreign objects in the control panel (e.g. mini-cameras). The requisite image data processing is performed principally in the data processing unit described hereinafter.

Figure 5:
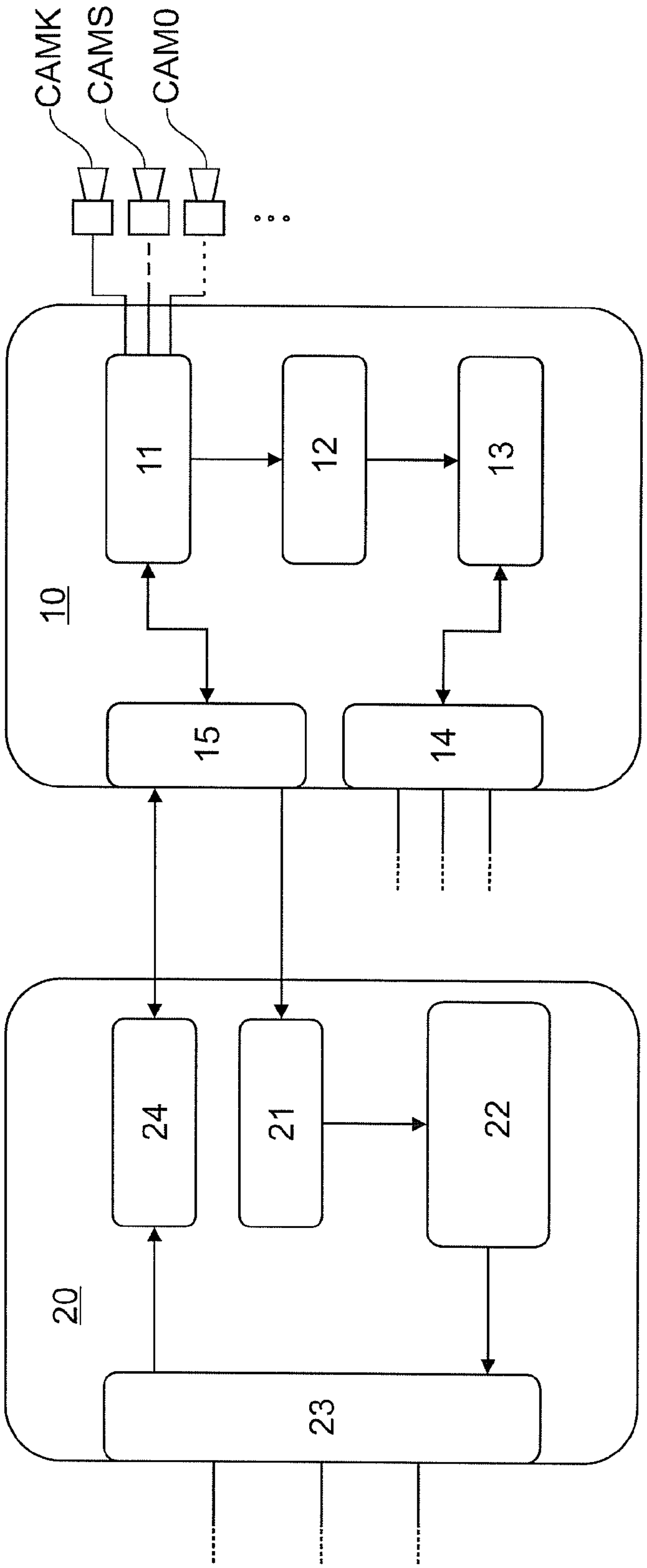
FIG. 5 shows a block diagram for a data processing unit connected to several of the cameras and video monitoring unit connected to said unit.

FIG. 5 shows the block diagram for a data processing unit 10 in accordance with the invention to which camera CAMS, CAMD and CAMK are connected, as well as a video surveillance unit, or CCVT unit 20, that is connected to the data processing unit 10. The data processing unit 10 has specifically the following stages or modules:

A first stage 11 for image processing, a second stage 12 for feature extraction, and a third stage 13 for classifying the processed data. Stage 13 is, in turn, connected to an interface 14 over which the various alarm or surveillance devices can be activated or controlled. These devices, known henceforth as AISS, include image falsification or manipulation detection (IFD). The first stage 11 that serves for image processing is in turn connected to a second interface 15 over which a link is established to the CCTV unit 20. As examples, remote surveillance or remote diagnosis, for example, can be performed with the help of this CCTV unit.

The data processing unit 10 is primarily responsible for processing the image data D generated by camera CAMS, CAMD and CAMK. The image data D arrive initially at the first stage 11 that preprocesses the incoming image data, when steps such as shadow removal, edge detection, vectorizing and/or segmenting in particular are carried out. The downstream second stage 12 is used for feature extraction, which can be carried out, for example, by means of blob analysis, edge positioning and/or color distribution. Blob analysis, for example, is used to detect cohesive areas in an image and to perform measurements on the blobs. A blob (binary large object) is an area of adjacent pixels having the same logic status. All pixels in an image that form part of a blob are in the foreground. All remaining pixels are in the background. In a binary image, pixels in the background have values that correspond to zero, while each pixel not equal to zero is part of a binary object.

Then, in stage 13, a classification is made which determines on the basis of the extracted features whether a hostile manipulation at the self-service terminal, or automated teller machine ATM, has been carried out or not.

The data processing unit 10 can, for example, be implemented by means of a personal computer that is linked to the automated teller machine ATM or is integrated into said ATM. Besides camera CAMS, CAMD and CAMK already described that capture images of the areas of the control panel CP already mentioned, the supplementary camera CAMO can be installed on the automated teller machine ATM (refer to FIG. 1) that is directed at the user or customer and specifically captures images of his face. This supplementary camera CAMO, also described as a portrait camera, can be activated to take a picture of the person standing at the ATM when a manipulation attack is detected. As soon as a skimming attack is detected, the system just described can perform the following actions:

Store a photograph of the attacker, when individual cameras CAMS, CAMD and CAMK as well as the supplementary portrait camera CAMO can be activated, Alarm the active automated teller machine applications and/or a central management server and/or a person, for example, by e-mail, Introduce counter-measures that include disabling or shutting down the automated teller machine, Transmit data, specifically images, of the manipulation detected, for example over the Internet or a central office.

The operator of the automated teller machine can configure the scope and the type of measures, or countermeasures, taken using the system described here.

As described above, several cameras can be provided, installed directly at the control panel, where cameras CAMS and CAMD capture images of the control panel from the outside and camera CAMK captures images of the card entry slot from the inside. A supplementary portrait camera can be installed in addition (see CAMO in FIG. 1). Cameras CAMS and CAMD at the control panel and camera CAMK in the card entry are used for the actual manipulation detection. The portrait camera CAMO is used for purposes of documenting a manipulation attempt.

All the cameras preferably have a resolution of at least 2 megapixels. The lenses used have an acquisition angle of about 140 degrees and greater. In addition, the exposure time of the cameras used can be freely adjusted over a broad range from 0.25 msec, for example, up to 8000 msec (8 secs.). In this way, it is possible to adjust to the widest possible range of lighting conditions. Tests by the applicant have shown that a camera resolution of about 10 pixels per degree can be obtained. Referred to a distance of one meter, it is possible to achieve an accuracy of 1.5 mm per pixel. This means, in turn, that a manipulation can be detected reliably using a reference deviation of 2 to 3 mm. The closer the camera lens is to the imaged element or observed object, the more precise the measurement. As a result, a precision of less than 1 mm can be achieved in closer regions.

Depending on where the automated teller machine will be used, for example outside or inside, as well as on the existing light conditions, it may be of advantage to install the camera CAM in the lateral part of the housing of the automated teller machine ATM or in the upper part of the housing. Various possibilities for surveillance exist depending on the camera position. When monitoring the different elements, or subregions, the following possibilities emerge:

Capturing images of the cash dispensing drawer (shutter) 1 permits checking for manipulation in the form of cash trappers, i.e. special overlays. Capturing images of the keypad area makes it possible to determine manipulation attempts using overlays or changes to security lighting. Capturing images of the installation panel makes it possible in particular to detect complete overlays. Capturing images of the card entry slot 4, particularly using an integral camera, makes it possible to detect manipulations in this area.

It has been shown that discrepancies of 2 mm can be clearly detected in particular at the keypad and the card slot. Discrepancies at the rear outer edge of the installation panel can be detected starting at 4 mm. Discrepancies at the lower edge of the shutter can be detected starting at 8 mm.

The data processing unit 10 (refer to FIG. 4) performs a comparison of the recorded image data D specifically with reference data to detect manipulations. An image of the outer region in particular can be inspected for its homogeneity and compared with the image of the outer region from the control panel camera.

The image data from the different cameras CAMS, CAMD and/or CAMK are also compared with one another to determine, for example, whether individual cameras have been manipulated. If, as an example, camera CAMD was covered, there is a discrepancy with the images from the other cameras. It can be established very quickly from the brightness of the images whether only a single camera is darkened so that manipulation or covering can be assumed. The combination and evaluation of several camera signals or image data increases the robustness of manipulation surveillance and prevention of false alarms. Some of the uses for the image data or information are as follows:

Distinguishing between artificial and natural darkening: if a camera is covered, the image it has recorded is inconsistent with the images from the other cameras. If the natural light (daylight) or the artificial light (area lighting) disappears, the effect is the same at all cameras or at least similar. Otherwise the system detects a manipulation attempt.

Detection of attacks to deceive the camera array, for example with photographs pasted in front of the cameras: if an individual camera shows a different image (brightness, movement, colors, particularly regarding the outer region), this indicates attempted deception.

Increasing robustness, particularly when the card entry slot is covered: If it is covered, the integral camera (see CAMK in FIG. 4*a*) shows a different image (particularly regarding the outer region) than the rest of the cameras (see CAMS, CAMD in FIG. 1).

Furthermore, the surroundings can be examined, for example, for light being emitted from the card entry slot 4. Connecting the system to the Internet over interface 23 makes it possible to control the camera, or the different cameras, by remote access. The image data obtained can also be transmitted over the Internet connection to a video server. So the respective camera acts almost as a virtual IP camera. The CCTV unit 20 described above in particular can serve the interests of such video surveillance, where the interface 15 to the CCTV unit is laid out for the following functions:

Retrieving an image, adjusting the image rate, the color model, and image resolution, triggering an event in the CCTV service when preparing a new image and/or possible visual enhancement of detected manipulation in an image that was supplied.

The system is designed such that in normal operation (e.g. withdrawing money, account status inquiry, etc.) no false alarms are created by hands and/or objects in the image. For this reason, manipulation detection is deactivated in the period of normal use of an ATM. Also, time periods of cleaning or other brief uses (filing bank statements, interaction before and after the start of a transaction) should not be used for manipulation detection. Essentially, only fixed and immobile manipulation attempts are preferable for analysis and detection. The system is designed such that surveillance operates even under a great variety of light conditions (day, night, rain, cloud, etc.). Similarly, briefly changing light conditions, such as light reflections, passing shadows and the like are compensated for or ignored in the image processing in order to prevent a false alarm. In addition, events of a technical nature, such as a lighting failure and the like, can be taken into consideration. These and other special cases are detected for classification and resolved in particular by the third stage.

The method carried out by the system described for detecting manipulation exhibits in particular the following sequence (refer to FIG. 4):

In a first step, an image is initially recorded (stage 11), where the camera parameters are adjusted to generate suitable images. In so doing, a series of images or corresponding image data D is recorded that serves as the basis, or reference, for pre-processing.

Then image data D are preprocessed (stage 11), where these data are processed such that they are suitable for further processing. For example, several images are combined into a target image and optimized using image enhancement algorithms. The following steps in particular are performed:

Shadow removal, deletion of moving objects, elimination of noise and/or combination of differently exposed images.

Some of the adjustments to the cameras are for different exposure times, to eliminate reflections and to assemble well lighted areas. The images are preferably assembled over a predetermined period in order to obtain the best possible images for manipulation detection. Feature extraction is performed in a third step (stage 12) in which image analysis methods are applied to the pre-processed images or image data in order to inspect said images or image data for specific features, such as edge positions or color distributions. A number or a value is assigned to each feature that indicated how well the corresponding feature was found in the scanned image. The values are collected in what is known as a features vector.

In a further step, a classification is carried out (Stage 13), i.e. the features vector is passed on to a classification sequence to reach a decision whether manipulation exists or not. Types of classifiers are used that are able to indicate a confidence, i.e. a probability or certainty, with which the decision holds true. The classification mechanisms used may include, for example:

Learning classifier systems, Bayes classifiers, support vector machines (SVM) or decision trees (CART or C 4.5).

The system described here is preferably modular in construction, in order to make different configurations possible. The actual image processing and the CCTV connection are implemented in different modules (refer to FIG. 4).

The system presented here is also suitable for documenting the manipulations detected, or archiving said manipulations digitally. In the event of a detected manipulation, the images recorded, along with corresponding meta-information, such as time stamp, type of manipulation, etc., are saved on a hard disc in the system or on a connected PC. Messages can also be forwarded to a platform for the purposes of reporting, such as error reports, status reports (deactivation, change of mode), statistics, suspected manipulation and/or alarm reports. In the event of an alarm, a suitable message containing the specific alarm level can be transmitted to the administration interface or system interface. The following possibilities can additionally be implemented at said system interface:

Retrieving camera data, such as the number of cameras, construction status, serial number, etc., master camera data, or adjustment of camera parameters and/or registration for alarms (notifications).

The invention presented here is specifically suitable for reliably detecting hostile manipulations at a self-service terminal, such as an automated teller machine. To this end, the control panel is continuously and automatically monitored by at least one camera. Using image data processing, the elements captured by the camera are measured optically to identify deviations from reference data. It has already been shown that discrepancies in the range of mere millimeters can be identified reliably. A combination of edge detection and segmenting is preferably used for detecting foreign objects so that contours of objects left behind can be clearly detected and identified. In the event of attempted manipulation, countermeasures or actions can be initiated.

The invention clearly increases the reliability with which manipulations can be detected through the combination proposed here of several cameras and intelligent image data processing.

In a preferred embodiment the invention has the following camera configuration:

One camera at the card entry slot, one camera at the control panel and one camera in the upper area of the automated teller machine for recording portrait photos or videos. In addition, the cameras are connected to the data processing unit previously described. Inside the data processing unit the image data or information acquired by the cameras is used in the following and other ways:

Detection of or distinguishing between artificial and natural darkening: If one camera is covered, the image it recorded is inconsistent with the images from the other cameras. If natural or artificial light disappears, the effect appears at all cameras equally. Detection of attacks on the camera system with intent to deceive, e.g. using pasted on photographs: If a camera shows another image (different brightness, movement, colors, etc.), this indicates an attempt to deceive. Increasing robustness of capping detection at the card entry slot: If the card entry slot is covered, the integral camera there CAMK shows a different image of the outer region than the other cameras.

Increasing the reliability of detection of manipulation attempts also helps to prevent false alarms.

In summary, a self-service terminal is proposed that has different control elements, such as a card entry slot (see "4" in FIG. 4*a*), where to detect manipulation attempts on the self-service terminal at least one camera (see CAMK in FIG. 4*a*) is integrated in this control element, for example the card entry slot, and captures images of several sub-regions assigned to this control element, such as inner, outer and transition regions (see FIG. 4*b*).

The present invention was described using the example of an automated teller machine but is not restricted thereto, rather it can be applied to any type of self-service terminal.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An automated teller machine that has elements provided in a control panel of the automated teller machine that are made available to users of the automated teller machine, wherein for surveillance of the automated teller machine and to detect manipulation attempts on the automated teller machine, a single camera integrated into a card entry slot provided in the control panel is configured to capture an image including several sub-regions assigned to the card entry slot including at least an inner region of the card entry slot, an outer region of the card entry slot, and a transition region of the card entry slot between the inner region and the outer region.

2. The automated teller machine according to claim 1, wherein the card entry slot imaged by the camera has lighting.

3. The automated teller machine claim 2, wherein the lighting illuminates one or some of the sub-regions of the card entry slot.

4. The automated teller machine according to claim 1, wherein the card entry slot is provided with a light-conducting material over which light generated by a light is conducted.

5. The automated teller machine according to claim 1, wherein the camera is connected to a data processing unit that processes the image data generated by the at least one camera, specifically segments and processes the image data corresponding to the sub-regions.

6. The automated teller machine according to claim 5, wherein the data processing unit has a first stage receiving the image data for image processing, specifically for shadow removal, edge detection, vectorizing and/or segmenting.

7. The automated teller machine according to claim 6, wherein the data processing unit has a second stage downstream from the first stage for feature extraction, specifically using blob analysis, edge position and/or color distribution.

8. The automated teller machine according to claim 7, wherein the data processing unit has a third stage downstream from the second stage for classification.

9. The automated teller machine according to claim 5, wherein the data processing unit has interfaces for video surveillance systems and/or security systems.

10. The automated teller machine according to claim 5, wherein the data processing unit is integrated into the automated teller machine.

11. The automated teller machine according to claim 1, wherein the automated teller machine has at least one additional camera that is mounted on or in the automated teller machine in proximity to the control panel and captures images of at least one of the elements.

12. The automated teller machine according to claim 11, wherein the elements provided in the control panel and imaged by the cameras include a cash dispensing drawer, a keypad, an installation panel, the card entry slot and/or a monitor.

13. The automated teller machine according to claim 1, wherein a supplementary camera is provided on the automated teller machine for an area in which a user, more specifically his head, is located while using the automated teller machine.

14. The automated teller machine according to claim 5, wherein the data processing unit, when it detects a manipulation attempt at the imaged elements using image data processing, triggers an alarm, disables the automated teller machine and/or starts the supplementary camera.

15. The automated teller machine according to claim 5, wherein the specific camera and/or the data processing unit is deactivated during the operation and/or maintenance of the automated teller machine.

16. An automated teller machine comprising: a control panel; a card entry element at the control panel defining a card entry slot to permit access to an inner region of the card entry slot and the automated teller machine from an outer region of the card entry slot; and a single camera integrated into the card entry element and configured to capture a single image including each one of the inner region, the outer region, and a transition region between the inner region and the outer region.

* * * * *